United States Patent [19]
Curtis et al.

[11] Patent Number: 5,940,370
[45] Date of Patent: Aug. 17, 1999

[54] ABR TRAFFIC MANAGEMENT IN ATM NETWORKS

[75] Inventors: Marc Simon Curtis, Maidenhead; Ana Ferrandiz Roca, London, both of United Kingdom

[73] Assignee: Fujitsu Limited, Kanagawa, Japan

[21] Appl. No.: 08/658,751

[22] Filed: Jun. 5, 1996

[30] Foreign Application Priority Data

Jun. 5, 1995 [GB] United Kingdom .................... 9511350

[51] Int. Cl.[6] .............................. H04J 3/14; H04L 12/56
[52] U.S. Cl. .......................... 370/231; 370/232; 370/396; 395/200.65
[58] Field of Search ..................... 370/230, 232, 370/234, 231, 235, 395, 396, 400, 401; 395/200.67, 200.62, 200.63, 200.64, 200.65

[56] References Cited

U.S. PATENT DOCUMENTS

| | | | |
|---|---|---|---|
| 4,551,833 | 11/1985 | Turner | 370/236 |
| 5,070,498 | 12/1991 | Kakuma et al. | 370/233 |
| 5,193,151 | 3/1993 | Jain | 395/200 |
| 5,241,534 | 8/1993 | Omuro et al. | 370/218 |
| 5,335,222 | 8/1994 | Kamoi et al. | 370/230 |
| 5,400,329 | 3/1995 | Tokura et al. | 370/232 |
| 5,497,375 | 3/1996 | Hluchyj et al. | 370/232 |
| 5,633,859 | 5/1997 | Jain et al. | 370/234 |

FOREIGN PATENT DOCUMENTS

| | | |
|---|---|---|
| 0587522A2 | 8/1993 | European Pat. Off. . |
| 2267200A | 11/1993 | United Kingdom . |
| 2281005A | 2/1995 | United Kingdom . |

OTHER PUBLICATIONS

Traffic Management Specification Version 4.0, The ATM Forum Technical Committee, ATM Forum/95–0013R8, Oct. 1995.
ATM Forum Traffic Management Specification; pp. 55–57.

*Primary Examiner*—Alpus H. Hsu
*Attorney, Agent, or Firm*—Helfgott & Karas, PC.

[57] ABSTRACT

Connection control apparatus is provided for use in an ATM network to control ABR connections provided by the network, each such ABR connection having an agreed minimum transmission rate which it is permitted to exceed when there is spare capacity in the network. The apparatus includes: congestion detection circuitry (32, 33) for determining the end-to-end delay experienced by ATM cells of each ABR connection as they pass through the network; and a rate control circuit (30) connected to the said congestion detection circuitry for detecting, based on the determined end-to-end delay, when one of the ABR channels is congested. When congestion in one of the ABR channels is detected the rate control circuit imposes on the ABR connection concerned a maximum transmission rate that is higher than and dependent upon the said agreed minimum transmission rate for the connection concerned.

Such apparatus can assist in achieving a fair allocation of bandwidth when congestion occurs in the network, and provides an effective way of detecting congestion without requiring processing at each intermediate node within the ATM network.

34 Claims, 8 Drawing Sheets

ABR TRAFFIC MANAGEMENT IN ATM NETWORKS

BACKGROUND OF THE INVENTION

1. Field of the Invention

The present invention relates to management of available bit rate (ABR) traffic in asynchronous transfer mode (ATM) networks.

2. Description of the Prior Art

In an ATM network, an ABR type connection is envisaged which negotiates a minimum transmission rate with the network operator when the connection concerned is established but which, in subsequent use of the network, is allowed to exceed its negotiated minimum transmission rate if and when spare capacity in the network arises. Thus, such an ABR connection is not restricted to the minimum transmission rate negotiated at the time the connection was established, and is permitted to transmit at a higher rate than its negotiated transmission rate provided that there is unused capacity in the network.

In the event of congestion, it is envisaged that an ABR connection with a rate exceeding its negotiated minimum transmission rate will first be given a feedback message inviting it to reduce its transmission rate. If an ABR connection does not then reduce its rate, the network will begin to discard traffic in excess of the negotiated minimum transmission rate. When the connection reduces its rate and congestion is alleviated, the connection will be allowed to increase its transmission rate again. Accordingly, ABR connections are at least guaranteed their respective negotiated minimum transmission rates and are in addition allowed to exceed those rates depending on spare capacity in the network and subject to flow control from the network.

Such ABR services are considered desirable in that any connections would prefer to dynamically adjust their transmission rates to the instantaneous available capacity in the network rather than have their ATM cells discarded during congestion as a result of continuing to transmit at higher rates than the network can allow. In other words, ABR services are suitable for connections in which low cell loss is important but some delay (which inevitably results from the need to reduce the transmission rate when congestion occurs) is permissible. ABR services enable connections to use excess capacity in the network, when available, rather than reserve capacity in advance which would involve significant cost outlays.

When a plurality of ABR connections are required in an ATM network, the sources associated respectively with these ABR connections effectively compete for available bandwidth in the network. It is desirable in such circumstances to provide a system for allocating the available bandwidth in a fair manner.

BRIEF SUMMARY OF THE INVENTION

According to a first aspect of the present invention there is provided connection control apparatus, for use in an ATM network to control ABR connections provided by the network, each such ABR connection having an agreed minimum transmission rate which it is permitted to exceed when there is spare capacity in the network, which apparatus includes: congestion detection means for determining the end-to-end delay experienced by ATM cells of each ABR connection as they pass through the network; and rate control means connected to the said congestion detection means for detecting, based on the determined end-to-end delay, when one of the ABR connections is congested, and operative, upon such detection, to impose on the ABR connection concerned a maximum transmission rate that is higher than and dependent upon the said agreed minimum transmission rate for the connection concerned.

Such apparatus can enable the available bandwidth to be shared in a fair manner by the ABR connections, when congestion is found to be occurring, by taking account of the agreed minimum transmission rates of the ABR connections.

By using end-to-end delay to detect congestion there is no need for each node within the network to be provided with means for detecting congestion at the node concerned; in other words all parts of the congestion detection means can be located at the edges of the network.

The minimum transmission rate may be specified as the Sustainable Cell Rate.

The maximum transmission rate imposed on the congested ABR connection is preferably proportional to the said agreed minimum transmission rate for the connection concerned, and still more preferably also dependent upon the agreed minimum transmission rates of other such ABR connections.

In a preferred embodiment the rate control means are arranged at an ingress node of the network that is linked to other parts of the network by an access link, and the maximum transmission rate imposed on the congested ABR connection is dependent upon the available capacity of the access link. That available capacity of the access link may be determined by subtracting from the full capacity of the access link the sum of the agreed minimum transmission rates of the ABR connections. In this case, no information is required by the rate control means about the available bandwidth in parts of the network other than the access link, and fair allocation of bandwidth is only considered over the access link, which simplifies the apparatus.

The maximum transmission rate $MAXR_{VCj}$ imposed on the congested ABR connection $VC_j$ may for example be made equal to:

$$MAXR_{VCj} = SCR_{VCj} + \left[\frac{SCR_{VCj}}{SCR_{VC1} + SCR_{VC2} + \ldots SCR_{VCn}}\right] AB$$

where:

VC1 to VCn denote the different ABR connections, $VC_j$ being the ABR connection in which congestion has been detected;

$SCR_{VCx}$ is the agreed minimum transmission rate of the ABR connection VCx; and AB is the said available bandwidth of the access link.

The apparatus preferably includes bandwidth allocation means operable, when a request is received by the apparatus for establishment of a new ABR connection, to determine the maximum transmission rate for the new connection and to recalculate the respective maximum transmission rates of all the existing ABR connections. Advantageously, the bandwidth allocation means are also operable, when the apparatus is in use, to determine, for example at regular intervals, an instantaneous available bandwidth of the said access link by subtracting from the said full capacity of the access link the sum of the actual transmission rates of the ABR connections, and are operable to calculate the maximum transmission rate of each ABR connection based on the determined instantaneous available bandwidth. For example the maximum transmission rate $MAXR_{VCj}$ of each ABR connection may be made equal to:

$$MAXR_{VCj} = SCR_{VCj} + \left[\frac{SCR_{VCj}}{SCR_{VC1} + SCR_{VC2} + \ldots + SCR_{VCn}}\right] IAB$$

where:

VC1 to VCn denote the different ABR connections;

$SCR_{VCx}$ is the agreed minimum transmission rate of the ABR connection VCx; and IAB is the determined instantaneous available bandwidth.

This enables the actual available bandwidth of the access link to be shared out fairly between the ABR connections when congestion occurs.

The rate control means are preferably operative to impose the said maximum transmission rate on the ABR connection concerned immediately when congestion of that connection is detected. The rate control means may send a feedback message to the data source of each ABR connection that is exceeding its said maximum transmission rate when that rate is imposed, which feedback message requests the data source concerned to reduce its transmission rate to the imposed maximum transmission rate. The rate control means may then impose further restrictions progressively (in accordance with a predetermined rate control algorithm) on the transmission rate of each ABR connection, if the congestion persists, until the transmission rate is reduced to the agreed minimum transmission rate for the connection concerned.

The rate control means may, for example, detect that congestion is occurring in one of the ABR connections when the determined end-to-end delay for that connection exceeds a predetermined threshold value.

In this case, for example, the said congestion detection means may comprise first and second circuits arranged respectively at ingress and egress nodes of the network, one of the said first and second circuits being operative to transmit a timing cell to the other of those circuits via the network, and the said other circuit being operative to determine the time of receipt of the timing cell concerned; the congestion detection means being operative to calculate the said end-to-end delay in dependence upon the time taken for the said timing cell to travel from the said one circuit to the said other circuit. The timing cell transmitted from the said one circuit to the said other circuit preferably carries timing information indicating the time of transmission of the cell concerned by the said one circuit, and the said other circuit includes relative delay calculation means operative to determine a relative delay value by calculating the difference between the said time of transmission of the timing cell and its time of receipt by the said other circuit. This enables a measure of the end-to-end delay to be obtained easily; such a measure is, however, relative, since normally the clock in the ingress node (used to establish the time of transmission of the timing cell) will not be synchronised with the clock in the egress node (used to establish the time of receipt of the timing cell). To provide an absolute measure the end-to-end delay, therefore, in a preferred embodiment the said other circuit is operative, following receipt of such a timing cell from the said one circuit, to transmit a corresponding timing cell back to the said one circuit via the network, and the said one circuit is operative to determine the time of receipt of the corresponding timing cell concerned; the said congestion detection means being operative to calculate the said end-to-end delay in dependence upon the average of the time taken for the timing cell to travel from the said one circuit to the said other circuit and the time taken for the said corresponding timing cell to travel from the said other circuit to the said one circuit. In this case the said corresponding timing cell transmitted from the said other circuit back to the said one circuit preferably carries timing information indicating the time of transmission of the cell concerned by the said other circuit and also indicating the said relative delay value, and the said one circuit includes round-trip-delay calculating means operative to determine a round-trip delay value by calculating the difference between the said time of transmission of the corresponding timing cell and its time of receipt by the said one circuit and subtracting from that difference the said relative delay value. In this arrangement, the effects of lack of clock synchronicity at the ingress and egress nodes are eliminated.

According to a second aspect of the present invention there is provided a method of controlling ABR connections in an ATM network, each such ABR connection having an agreed minimum transmission rate which it is permitted to exceed when there is spare capacity in the network, including the steps of: determining the end-to-end delay experienced by ATM cells of each ABR connecting as they pass through the network; detecting, based on the determined end-to-end delay, when one of the ABR connections is congested; and when such congestion is detected, imposing on the ABR connection concerned a maximum transmission rate that is higher than and dependent upon the said agreed minimum transmission rate for the connection concerned.

According to a third aspect of the present invention there is provided congestion detection apparatus, for use in an ATM network, including: end-to-end delay determining means operable to determine the end-to-end delay experienced by ATM cells of a virtual channel of the network as they pass through the network; and congestion detection means connected to the end-to-end delay determining means for detecting congestion in the virtual channel concerned based on the determined end-to-end delay.

According to a fourth aspect of the present invention, there is provided a method of detecting congestion in an ATM network, including the steps of: determining the end-to-end delay experienced by ATM cells of a virtual channel of the network as they pass through the network; and employing the determined end-to-end delay to detect when congestion is occurring in the virtual channel concerned.

DETAILED DESCRIPTION OF THE PREFERRED EMBODIMENTS

Figure 1:
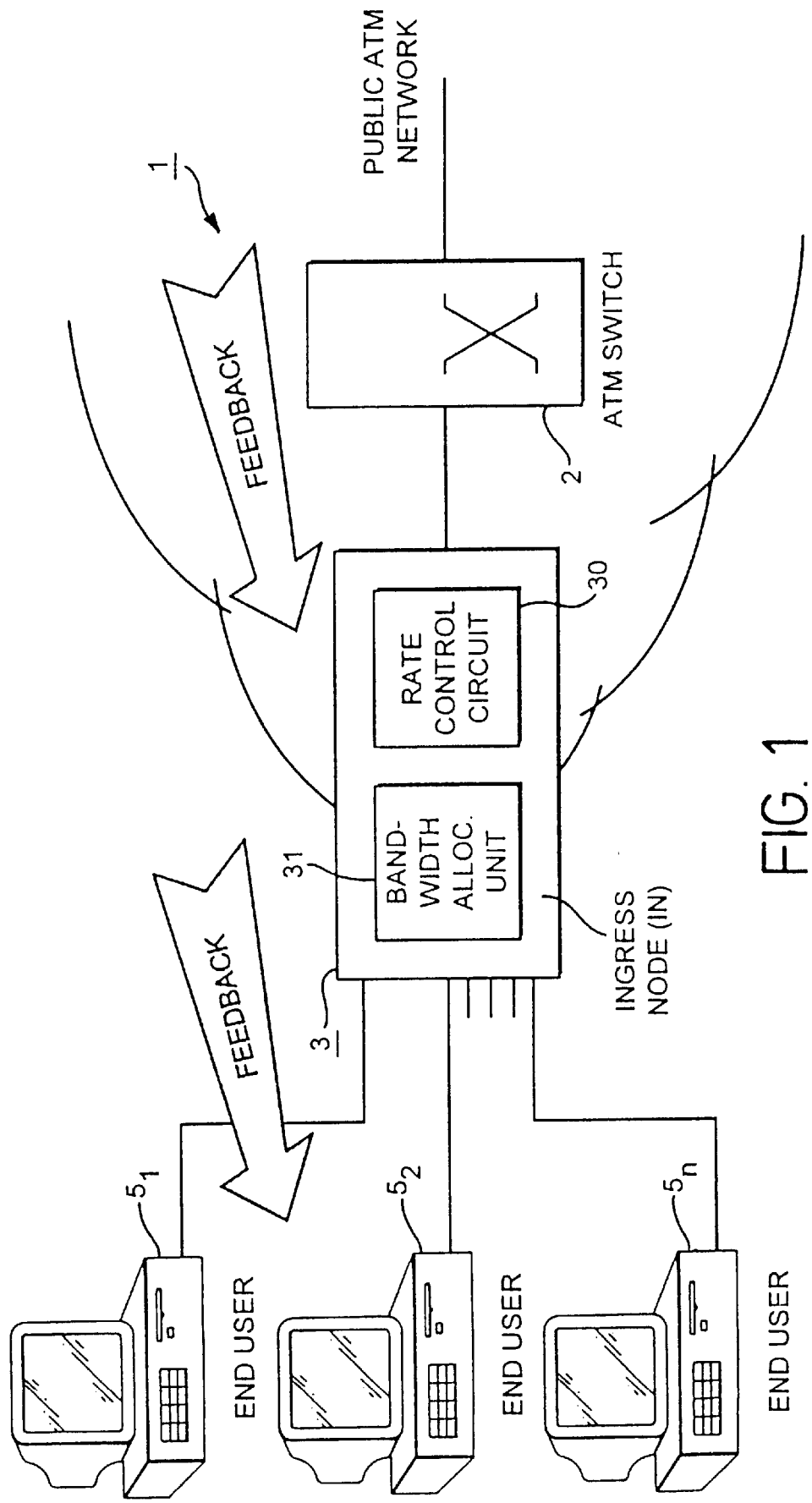
FIG. 1 shows a schematic view of parts of an ATM network having, at an ingress node thereof, connection control apparatus embodying the present invention.

FIG. 1 shows a public ATM network 1 including an ATM switch 2 and having, at an ingress node IN of the network, connection control apparatus 3. The ATM switch 2 and connection control apparatus 3 are connected together via an access link 4 within the ATM network 1.

A plurality of data sources $5_1, 5_2, \ldots 5_n$, for example personal computers or the like, are connected to the connection control apparatus 3 at the ingress node IN.

The connection control apparatus 3 includes a rate control circuit 30 and a bandwidth allocation unit 31.

Operation of the connection control apparatus 3 of FIG. 1 will now be described with reference to FIGS. 2 to 4.

Figure 2:
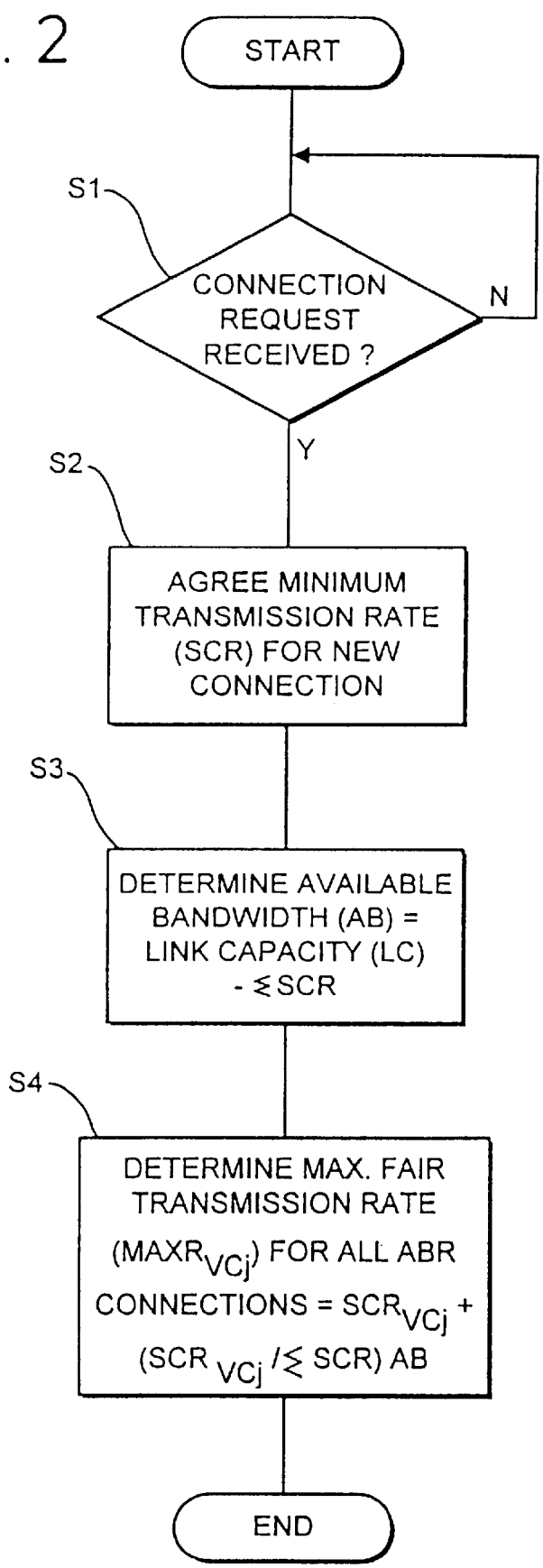
FIGS. 2 to 4 show flowcharts for explaining operation of the FIG. 1 connection control apparatus.

FIG. 2 shows the operations performed by the connection control apparatus 3 when a request is received from one of the data sources 5 to establish a new ABR connection.

In step S1 in FIG. 2, the connection control apparatus 3 waits until a connection request is received. It is expected that when making a connection request a data source will specify a minimum usable bandwidth or Sustainable Cell Rate (SCR). This Sustainable Cell Rate represents the minimum transmission rate which the connection concerned is guaranteed by the network to have, even when congestion is occurring in the network. This Sustainable Cell Rate is negotiated by the data source concerned with the network operator when the connection is first established (step S2 in FIG. 2).

In step S3, the bandwidth allocation unit 31 of the connection control apparatus 3 determines the available bandwidth (AB) of the access link 4 by subtracting from the access link capacity (LC) the sum of the Sustainable Cell Rates ($SCR_{VC1}, \ldots SCR_{VCn}$) of the different ABR connections (VC1, ... $V_{Cn}$) that are now in use:

$$AB = LC - (SCR_{VC1} + SCR_{VC2} + \ldots + SCR_{VCn}) \quad (1)$$

Then, in step S4, the bandwidth allocation unit 31 of the connection control apparatus 3 determines a maximum transmission rate $MAXR_{VCj}$ allowed for each ABR connection VCj when congestion in the network is occurring, employing the agreed minimum transmission rate ($SCR_{VCj}$) for the ABR connection concerned to determine its "fair share" of the available bandwidth (AB) determined by formula (1):

$$MAXR_{VCj} = SCR_{VCj} + \left[ \frac{SCR_{VCj}}{SCR_{VC1} + SCR_{VC2} + \ldots SCR_{VCn}} \right] AB \quad (2)$$

In this way, it can be seen that, when a new ABR connection is established, the maximum transmission rates of all the currently-active ABR channels are adjusted with a view to ensuring that when congestion occurs each connection is allocated its fair share of the available bandwidth (AB) of the access link.

It will be appreciated that, in the embodiment described above, the Sustainable Cell Rate of an ABR connection is used to calculate, in a proportional manner, a maximum fair transmission rate (or bandwidth) MAXR threshold that the connection concerned can have in the event of congestion. This ensures that when congestion occurs fair allocation of bandwidth for all ABR connections is achieved regardless of their transmission rates.

Furthermore, because the connection control apparatus 3 only considers fair bandwidth allocation over the access link 4, no information is required regarding the available bandwidth in other parts of the ATM network.

Operation of the rate control circuit 30 of the connection control apparatus 3 will now be described with reference to FIG. 3. The function of the rate control circuit 30 is to exercise control over the ABR connections using the access link 4. To implement such control, the rate control circuit 30 maintains, for each ABR connection VCj, the following parameters:

$SCR_{VCj}$—the agreed Sustainable Cell Rate (minimum transmission rate) of the connection;

$PCR_{VCj}$—the Peak Cell Rate (maximum transmission rate) for the connection. This peak cell rate is optionally specified by the connection when it is established; otherwise it may be, for example, simply made equal to the link capacity LC of the access link 4 so that, when no other ABR connections are using the access link 4, the connection concerned can increase its transmission rate to use the full link capacity of the access link; and $MAXR_{VCj}$—the maximum fair transmission rate for the connection when congestion is occurring.

Figure 3:
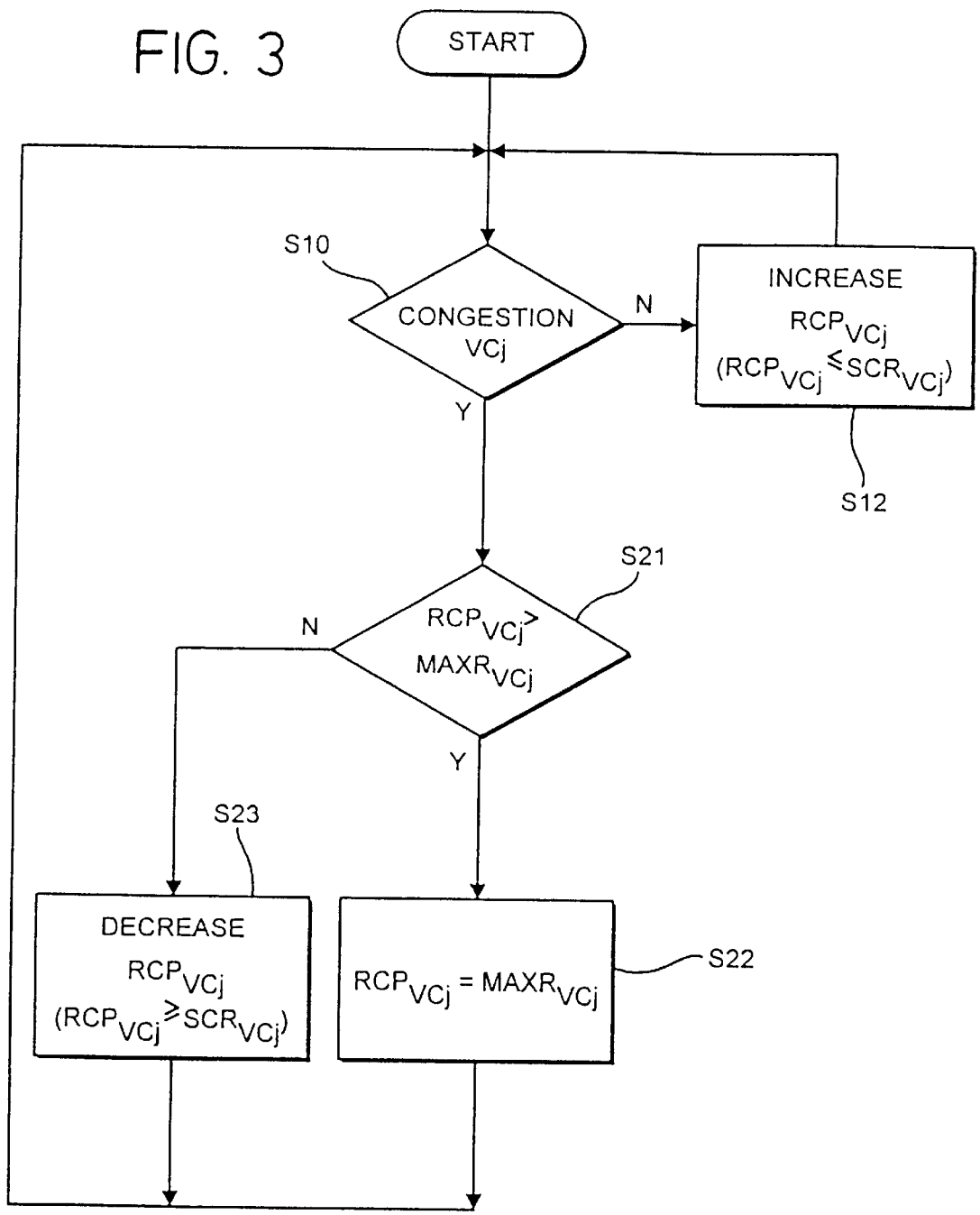

Based on the above parameters, the rate control circuit 30 determines a rate control parameter $RCP_{VCj}$ for each connection, as outlined in FIG. 3.

In FIG. 3, the rate control circuit 30 determines in step S10 whether or not congestion is occurring in one of the ABR connections $VC_j$. If no congestion is occurring in that connection, processing proceeds to step S12 in which the rate control parameter $RCP_{VCj}$ for the ABR connection $VC_j$ is increased according to a predetermined rate control algorithm. The details of one such algorithm will be provided later in the present specification. The RCP value is not, however, permitted to exceed the Peak Cell Rate ($PCR_{VCj}$ for the connection concerned). Processing returns to step S10.

Thus, it can be seen that, when no congestion is found to be occurring, the ABR connection $VC_j$ is allotted an increased RCP value in accordance with the predetermined rate control algorithm.

If, in step S10, it is determined that congestion is occurring in the ATM network, then, in step S21, it is determined whether or not the rate control parameter $RCP_{VCj}$ is greater than the determined maximum fair transmission rate $MAXR_{VCj}$ for the connection $VC_j$. If the rate control parameter exceeds the determined maximum fair transmission rate, then in step S22 the rate control parameter for the connection concerned is reduced immediately to the determined maximum fair transmission rate. Otherwise, in accordance with the above-mentioned predetermined rate control algorithm the rate control parameter $RCP_{VCj}$ for the ABR connection concerned is decreased. The rate control parameter is not, however, permitted to become lower than the agreed Sustainable Cell Rate $SCR_{VCj}$ for the connection concerned.

Then processing returns to step S10.

Thus, if congestion is found to be occurring in the ABR connection VCj, the rate control parameter RCP of that connection is immediately restricted to the maximum fair transmission rate $MAXR_{VCj}$ determined for the connection so that the connection is immediately invited, by an appropriate feedback message sent to its data source, to reduce its transmission rate to the determined maximum fair transmission rate. If such reduction does not alleviate congestion, the rate control parameter for the ABR connection is progressively reduced further (towards the Sustainable Cell Rate), and further feedback messages are sent to the data source. The data source concerned should respond to this feedback message by reducing its transmission rate. However, if it does not reduce its rate, the rate control circuit begins to discard traffic (cells) in excess of the negotiated minimum transmission rate (SCR).

In a preferred embodiment, the bandwidth allocation unit 31 is also operable to recalculate the maximum fair transmission rate for each ABR connection at regular intervals in dependence upon the instantaneous activity on the access link 4. Such recalculation can be advantageous because of the "bursty" nature of ABR traffic. In this respect, if connection utilisation is considered at a particular instant in time, a number of the ABR connections in the access link will not be transmitting data. This means that there is potentially more available bandwidth than was calculated, when the last new ABR connection was established, using the "static values" of Sustainable Cell Rates (SCR). By determining the instantaneous available bandwidth (IAB) at regular intervals based not on the static values (SCR values) but on the real instantaneous activity of the various ABR connections, the ABR connections can be allocated fair shares of that instantaneous available bandwidth (IAB).

In order to keep track of such instantaneous activity of the connections, the rate control circuit 30 maintains a further parameter for each connection, namely an Actual Cell Rate (ACR) parameter representing the current cell transmission rate of the connection concerned.

Figure 4:
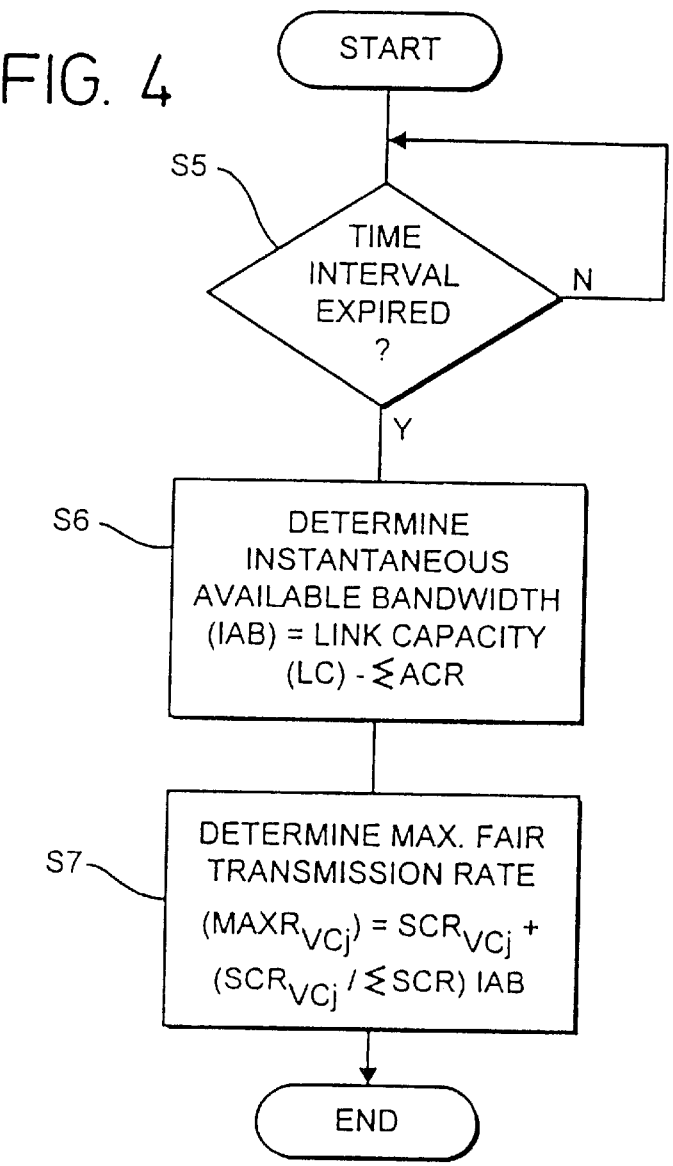

As shown in FIG. 4, the bandwidth allocation unit 31 waits until a predetermined time interval has expired in step S5 before proceeding to step S6 in which an instantaneous available bandwidth (IAB) is calculated based on the access link capacity (LC) and the sum of the respective actual transmission rates (actual cell rates ACR) of the ABR connections:

$$IAB = LC - (ACR_{VC1} + ACR_{VC2} + \ldots + ACR_{VCn}) \quad (3)$$

Then, in step S7, the maximum fair transmission rate $MAXR_{VCj}$ for each ABR connection VCj is determined by adding to the SCR value $SCR_{VCj}$ for the connection concerned a "fair share" of the determined instantaneous available bandwidth. Again, the fair share is calculated in dependence upon the SCR values of the different ABR connections:

$$MAXR_{VCj} = SCR_{VCj} + \left[ \frac{SCR_{VCj}}{SCR_{VC1} + SCR_{VC2} + \ldots + SCR_{VCn}} \right] IAB \quad (4)$$

By employing the FIG. 4 procedure, it can be assured that the fair shares of the bandwidth are always calculated having regard to the current activity on the access link 4.

Figure 5:
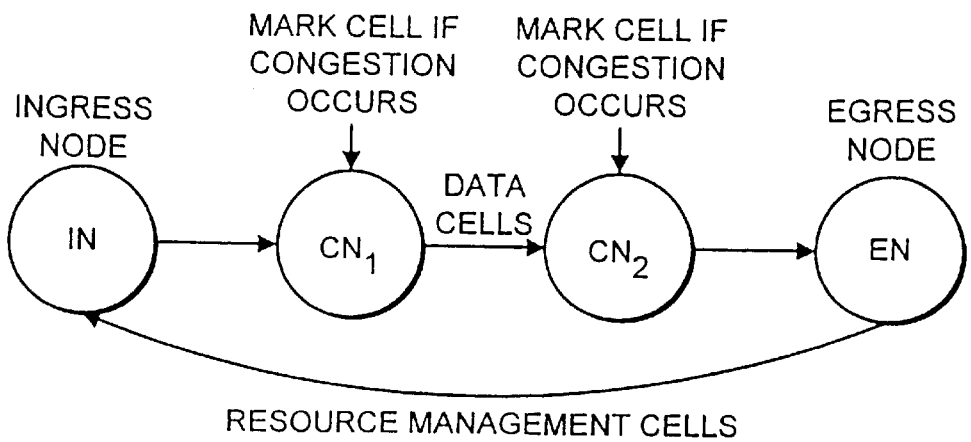
FIG. 5 shows a schematic diagram for use in explaining a flow control technique applicable to ATM networks.

In order for the rate control circuit 30 to exercise appropriate control over its ABR connections, it is necessary for the rate control circuit to have some means of detecting when congestion is occurring in the ATM network 1. One method previously considered for detecting such congestion is illustrated in FIG. 5 which shows the path of a single ABR connection between an ingress node IN and an egress node EN of an ATM network. ATM cells transmitted via the ABR connection concerned pass along a particular route through the ingress node IN and through various intermediate connection nodes $CN_1$ and $CN_2$ and on through the egress node EN. There is, for example, an ATM switch at each connection node CN.

At each node IN, EN, CN of the network is a buffer and congestion is detected when any buffer reaches a certain fill level. When a node detects congestion in this way, it marks cells passing therethrough in a predetermined way; if the receiving end equipment (connected to the egress node EN) receives cells that are marked "congestion experienced", this information is then signalled back to the source end equipment (data source connected to the ingress node IN), using resource management cells, so that the source end equipment can adjust its transmission rate accordingly.

Although the above approach enables congestion to be signalled back to the data source, it suffers from the disadvantage that each node within the network must be capable of marking cells when congestion is detected at the node concerned. This intermediate nodal processing increases the cost of the equipment at each node.

Figure 6:
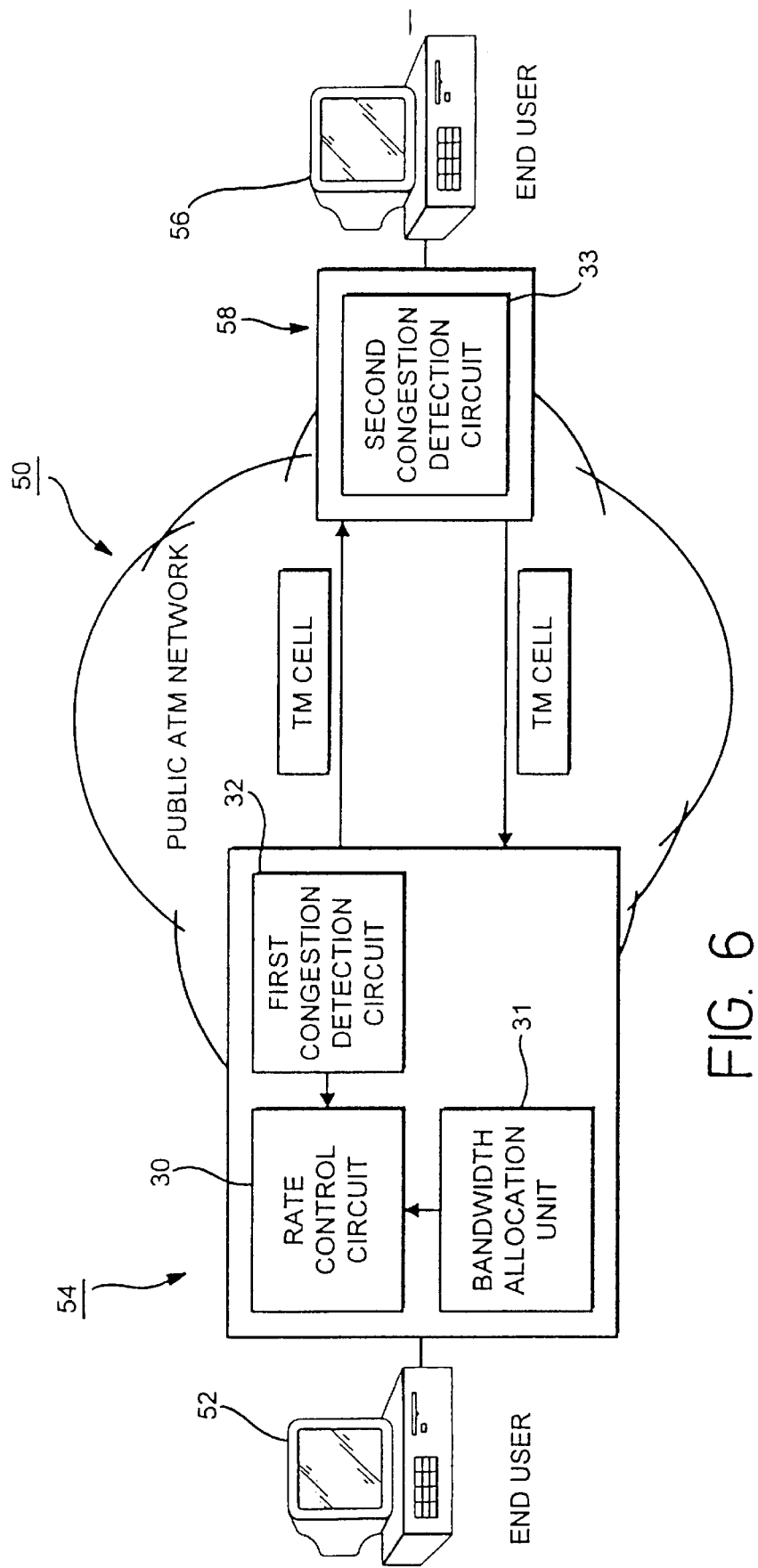
FIG. 6 shows a schematic view of parts of an ATM network having connection control apparatus according to a preferred embodiment of the present invention.

An alternative approach, in accordance with the present invention, intended to overcome the above disadvantage is illustrated in FIG. 6. In FIG. 6, an ATM network 50 is used to provide an ABR connection (virtual channel) between first and second end users, the first end user having a personal computer 52, serving as a data source, connected to an ingress node 54 of the ATM network 50, and the second end user having a personal computer 56, serving as a data receiver, connected to an egress node 58 of the network 50.

As shown in FIG. 6, the ATM network 50 has connection control apparatus 3' including, at the ingress node 54, a rate control circuit 30 and a bandwidth allocation unit 31. In this case the connection control apparatus 3' also includes first and second congestion detection circuits 32 and 33, the first congestion detection circuit 32 being located at the ingress node 54 and the second congestion detection circuit 33 being located at the egress node 58. Details of the congestion detection circuits 32 and 33 are shown in FIGS. 7(A) and 7(B) respectively.

Figure 7A:
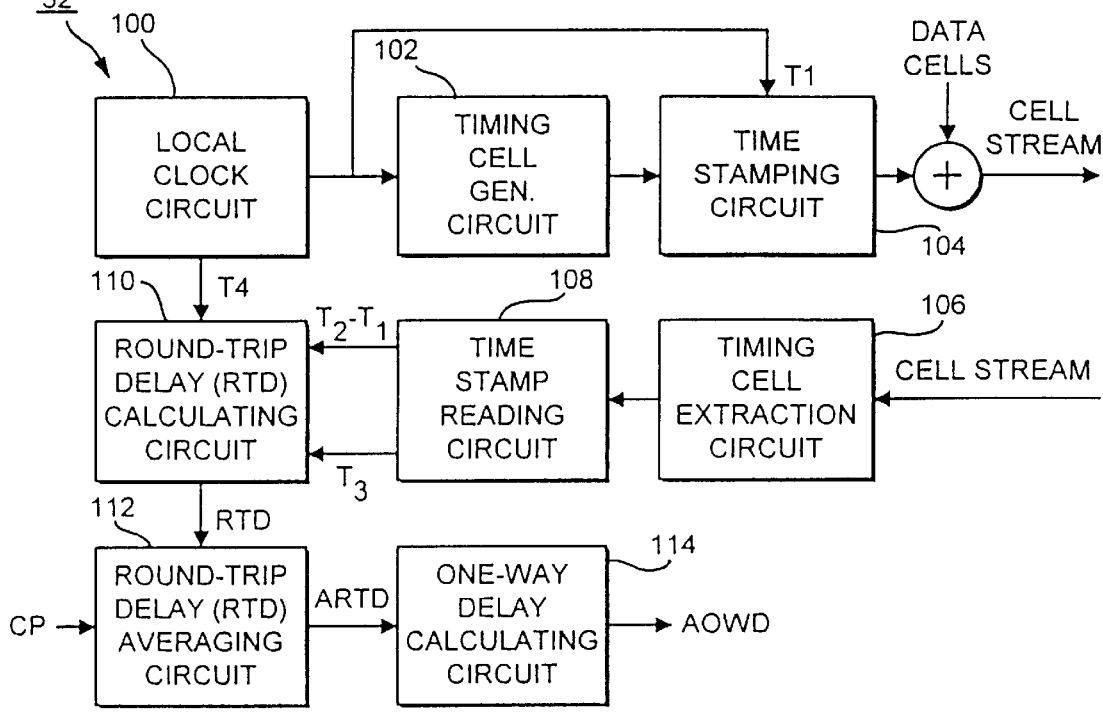
FIGS. 7(A) and 7(B) are block diagrams showing parts of the FIG. 6 apparatus.

As shown in FIG. 7(A), the congestion detection circuit 32 in the ingress node includes a local clock circuit 100, a timing cell generating circuit 102, a time stamping circuit 104, a timing cell extraction circuit 106, a time-stamp reading circuit 108, a round-trip-delay calculating circuit 110, an averaging circuit 112 and a one-way delay calculating circuit 114.

Figure 7B:
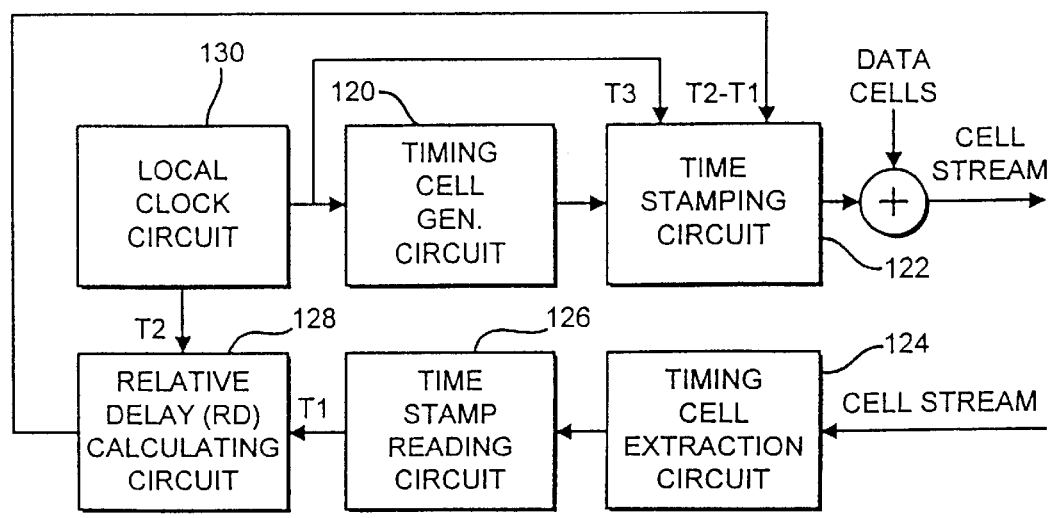

As shown in FIG. 7(B), the congestion detection circuit 33 in the egress node 58 includes a timing cell generating circuit 120, a time stamping circuit 122, a timing cell extraction circuit 124, a time-stamp reading circuit 126, a relative delay calculating circuit 128 and a local clock circuit 130.

Figure 7C:
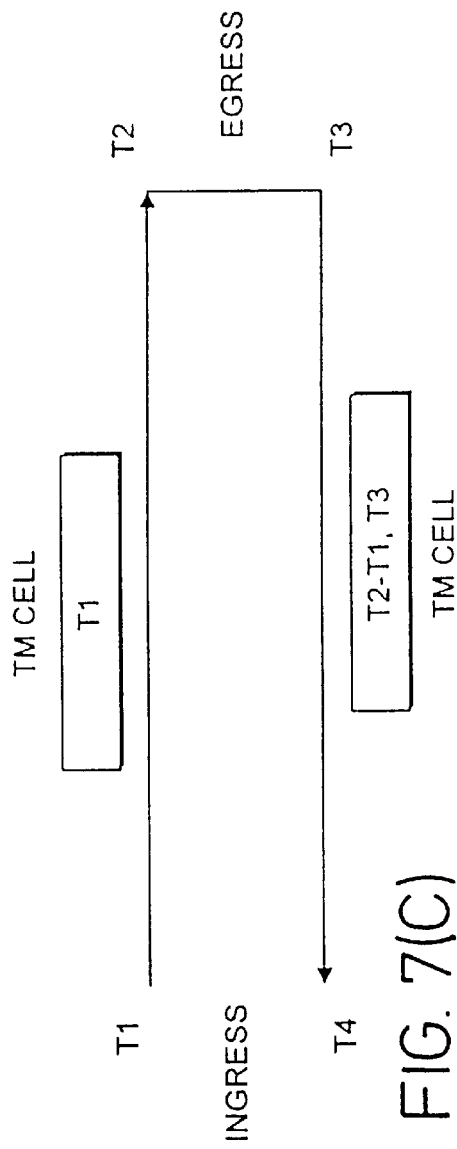
FIG. 7(C) is a schematic diagram for explaining operation of the parts of the FIG. 6 apparatus shown in FIGS. 7(A) and 7(B)

When the ABR connection between the first and second end users is in use, the timing cell generating circuit 102 in the ingress node congestion detection circuit 32 produces timing cells (TM cells) at regular intervals determined by the local clock circuit 100 in the ingress node. These TM cells are inserted into the cell stream of the virtual channel concerned going towards the network egress node 58. The time T1 at which each such cell is inserted into the cell stream is "stamped" on the cell itself by the time stamping circuit 104, as indicated in the upper half of FIG. 7(C).

Figure 7D:
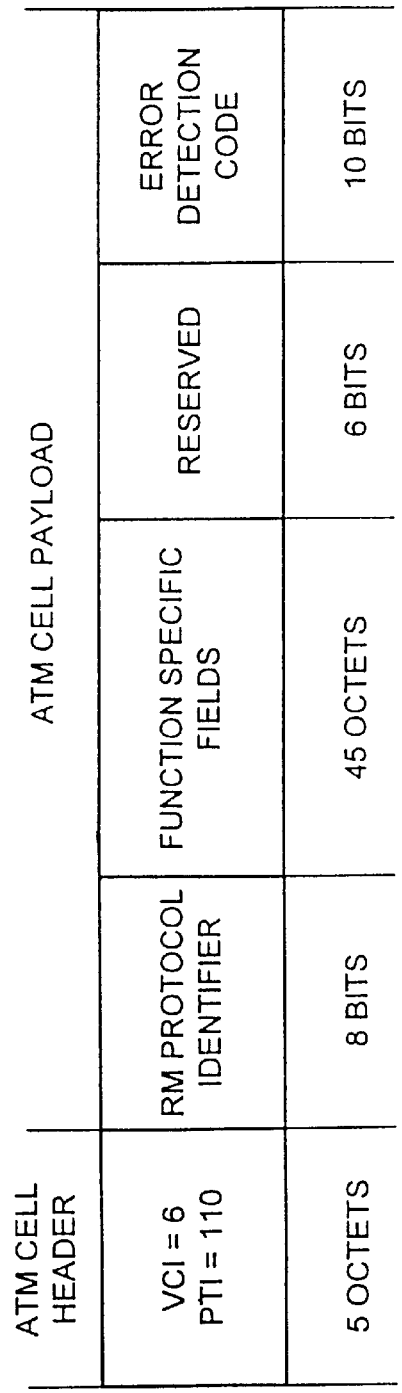
FIG. 7(D) is a schematic diagram illustrating the format of a resource management cell in an ATM network.

The TM cells generated at the ingress node 54 travel through the ATM network 50 in the same way as regular data cells. TM cells are based on resource management cells (RM cells) as defined in ITU recommendation 1.371. RM cells are ATM cells and can be uniquely identified from other ATM cell types from the VCI (Virtual Channel Identifier) value and the PTI (Payload Type Identifier) in the ATM cell header. FIG. 7(D) shows the protocol for the RM cell format. The function specific field is available for vendor specific implementations.

The TM cell extracting circuit 124 in the egress node congestion detection circuit 33 receives the cell stream and extracts therefrom the TM cells carried in the stream. When each TM cell is received by the egress node, the time T2 of receipt (as measured by the local clock circuit 130) is supplied to the relative delay calculating circuit 128. Each extracted TM cell is passed to the time-stamp reading circuit 126 which reads therefrom the time-stamp T1 carried by each cell. The time-stamp T1 is also supplied to the relative delay calculating circuit 128.

The relative delay calculating circuit 128 calculates the difference between the time-stamp T1 of the received TM cell and the time T2 of receipt of the TM cell concerned. This difference (T2−T1) is the relative delay (RD) experienced by the TM cell concerned in travelling from the network ingress node to the network egress node; it is not an absolute delay because the local clock circuits 100 and 130 at the two nodes may not be synchronised.

Following calculation of the relative delay RD for each TM cell received from the ingress node, the timing cell generating circuit 120 at the egress node generates a corresponding TM cell for insertion into the cell stream going in the reverse direction back to the ingress node. As shown in the lower half of FIG. 7(C), this TM cell is "stamped" by the time stamping circuit 122 not only with the relative delay RD (T2−T1) calculated by the relative delay calculating circuit 128 but also with the time T3 at which the generated TM cell is inserted into the reverse-direction cell stream.

In the ingress node congestion detection circuit 32, the TM cell extraction circuit 106 extracts the timing cells from the received cell stream and the time-stamp reading circuit 108 reads from each TM cell both the relative delay RD and the time stamp T3. This information is passed to the round-trip-delay calculating circuit 110.

The time T4 of receipt of each TM cell at the ingress node 54 is also supplied to the round-trip-delay calculating circuit 110 which calculates a round-trip-delay time (RTD) representing the combined time taken for a timing cell to travel from the ingress node to the egress node and for the corresponding TM cell generated by the egress node congestion detection circuit 33 to travel from that node back to the ingress node. Thus, $$RTD=(T4-T1)-(T3-T2)$$

Several measures of the round-trip-delay time RTD are taken in a predetermined control period (CP) and the resulting RTD values are averaged by the RTD averaging circuit 112 to produce an average round-trip-delay value ARTD. Finally, the ARTD value is divided by 2 in the one-way delay calculating circuit 114 to produce an average one-way delay value (AOWD), i.e.

$$AOWD=ARTD/2$$

The control period CP is generally chosen to be smaller than ARTD. There are several trade-offs involved in choosing the control period; the longer the control period used to estimate the delays, the slower the reaction time; on the other hand, the longer the control period, the better the estimate of delay.

It will be appreciated that, by processing timing cells in the manner described above, the level of congestion in the network can be estimated purely on the basis of delay experienced. Thus, all functionality for the congestion detecting mechanism is maintained at the edges of the network (at the ingress and egress nodes), thereby avoiding the requirement for intermediate nodal processing of the kind shown in FIG. 5 (addition of mark cells).

In practice, of course, many ABR connections may pass through each ingress (and egress) node, and it is required to be able to detect when congestion is occurring in each of these ABR connections. To this and, the ingress node congestion detection circuit 32 generates timing cells for all the different ABR connections entering the network at the ingress node concerned in a sequential manner, thereby enabling the level of congestion in each of those connections to be monitored. Because the different ABR connections will in practice experience widely differing round-trip-delay times (in dependence upon the distance between the ingress node and the relevant egress node and the number of intermediate network hops), the timing cells received back will not be in the same sequence as the timing cells were transmitted by the ingress node congestion detection circuit.

For this reason, it is preferable for the rate control circuit at the ingress node to operate in an interrupt-driven manner, waiting for each new TM cell to be received and then determining to which ABR connection the received TM cell belongs based on the connection identifier in the header portion of the TM cell. The RCP parameter for the ABR connection thus identified can then be adjusted accordingly, as described hereinafter with reference to FIG. 8.

Operation of the rate control circuit 30 in the ingress node 54 will now be explained with reference to FIG. 8.

In the rate control circuit 30, as described previously a rate control parameter (RCP) is maintained for each ABR connection which indicates the current rate of transmission for the connection concerned. In the present embodiment this rate control parameter is adjusted dynamically by the rate control circuit 30 based upon the AOWD value (representing a measure of congestion experienced in the network by the connection concerned), as well as the aforementioned parameters SCR, PCR and MAXR for the connection concerned.

The rate control circuit 30 defines a target range ($\sigma_1$ to $\sigma_2$) for the AOWD value of each ABR connection and adjusts the RCP value of each ABR connection so as to tend to keep its AOWD value within the target range. Thus, If $\sigma 1 < AOWD < \sigma 2$, no change is made to RCP.

If $AOWD \leq \sigma 1$, then each RCP is allowed to increase by a predetermined increase factor $\alpha$.

If $AOWD \geq \sigma 2$, then each RCP is decreased by a predetermined reduction factor $\beta$.

The lower and upper threshold values $\sigma 1$ and $\sigma 2$ delimiting the target range can be calculated in dependence upon the Minimum Delay through the connection (i.e. the delay through the connection when no queuing is taking place anywhere). Thus, $\sigma 1$=Minimum Delay+Line Service Time×s1, and $\sigma 2$=Minimum Delay+Line Service Time×s2, where the Line Service Time represents the time taken to launch an ATM cell into the connection, and s1 and s2 are constant values and are specific to the particular ATM network concerned. These constant values s1 and s2 need to be chosen such that cell loss due to buffer overflow in the network is avoided. These values are therefore dependent on the minimum buffer size within the intermediate network nodes.

To set the upper and lower threshold values $\sigma 1$ and $\sigma 2$, and also the control period CP mentioned above for determining the AOWD value, may require knowledge of the above-mentioned Minimum Delay in the network. This Minimum Delay will not normally be known prior to connection establishment so, as an approximation, the distance of the optimum path through the network for the connection concerned could be used to produce a measure of minimum delay.

The increase and reduction factors $\alpha$ and $\beta$ are determined in accordance with a predetermined rate control algorithm. These factors can be chosen to be linear or non-linear and could be adjusted appropriately depending on the target network configuration. In this way, the performance of the rate control algorithm can be optimised to achieve the best possible utilisation of available bandwidth.

Figure 8:
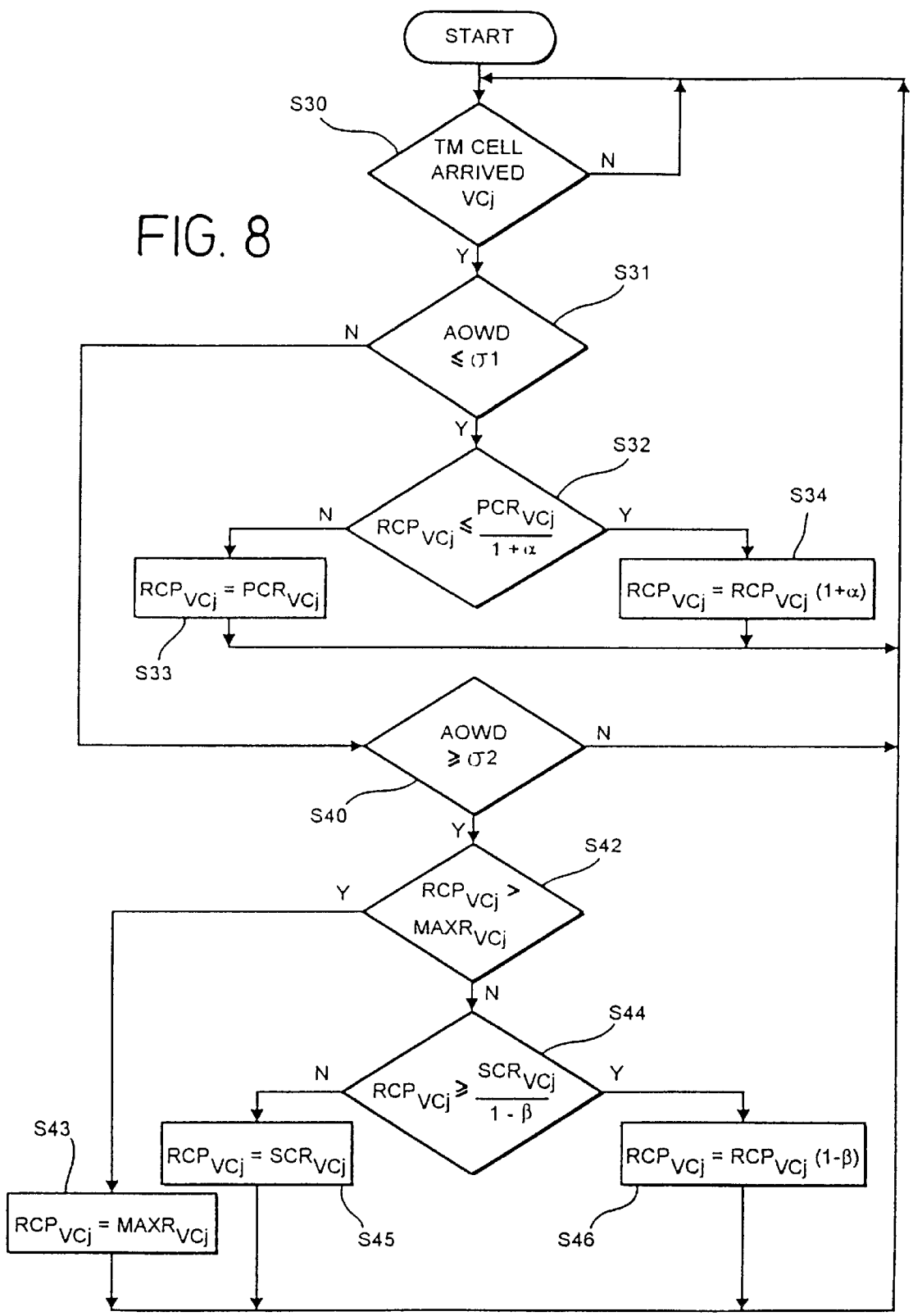
FIG. 8 show a flowchart for explaining operation of the FIG. 6 apparatus.

In FIG. 8, the rate control circuit waits at step S30 for a TM cell to be received. This event may, for example, be signalled by an interrupt. When a TM cell is received the connection VCj to which it belongs is identified using the header information carried by the cell to address a look-up table. Then, in step S31 it is established whether or not the calculated delay value AOWD (supplied to the rate control circuit 30 by the ingress node congestion detection circuit 32) is less than the lower threshold value σ1. If it is, the rate control parameter RCP for the identified ABR connection VCj can be increased by the predetermined increase factor α because it is concluded that there is no currently no congestion taking place in that connection. Before any increase is made to the RCP value for VCj, in step S32 it is determined whether the increased RCP value would exceed the Peak Cell Rate (maximum transmission rate) PCR for the connection concerned. As mentioned previously this PCR value may, for example, be agreed between the connection and the network operator upon establishment of the connection, or may be equal to the access link capacity.

If the increased RCP value would exceed the PCR value, then in step S33 the new RCP value is simply set to that agreed PCR value. Otherwise, in step S34, the value of RCP is increased by the increase factor α.

If in step S31, it is determined that the calculated delay value AOWD is greater than the lower threshold value σ1, then in step S40 the AOWD value is compared with the upper threshold value σ2. If AOWD is less than σ2, then AOWD is within the target range and no change to the RCP value of the connection is required. Processing returns to step S30 to await receipt of the next TM cell.

On the other hand, if AOWD is greater than or equal to the upper threshold value σ2, it is determined that congestion is occurring in the network. In such a case, it is determined in step S42 whether or not the current RCP value for the identified connection VCj exceeds the maximum fair transmission rate MAXR determined for the connection concerned by the bandwidth allocation unit 31. If the current RCP value exceeds this determined maximum fair transmission rate MAXR, then in step S43 the new RCP value is simply set to the determined maximum fair transmission rate MAXR.

Otherwise, it is determined that the RCP value should be reduced by the predetermined reduction factor β. In step S44, it is determined whether the reduced RCP value would be less than the agreed minimum transmission rate (sustainable cell rate SCR) for the connection concerned. If it would be less, then in step S45 the new RCP value is simply set to that minimum transmission rate SCR. Otherwise, in step S46, the RCP value is decreased by the predetermined reduction factor β.

The maximum transmission rates MAXR for the different ABR connections can be changed, while the network is in use, either when a new connection is established (FIG. 2) or following a check on the instantaneous available bandwidth (FIG. 4).

What we claim is:

1. Connection control apparatus, for use in an ATM network to control ABR connections provided by the network, each said ABR connection having an agreed minimum transmission rate which it is permitted to exceed when there is spare capacity in the network, which apparatus includes:

maximum transmission rate calculation means for calculating for each said ABR connection a maximum transmission rate that is higher than and dependent upon said agreed minimum transmission rate for the connection concerned;

congestion detection means for determining the end-to-end delay experienced by ATM cells of each ABR connection as they pass through the network; and rate control means connected to said congestion detection means for detecting, based on the determined end-to-end delay, when one of the ABR connections is congested, and operative, upon such detection, to impose on the ABR connection concerned its said maximum transmission rate, and, when no such congestion of the ABR connection concerned is detected, to permit the ABR connection concerned to exceed that maximum transmission rate.

2. Apparatus as claimed in claim 1, wherein the imposed maximum transmission rate is increased when said agreed minimum transmission rate increases for the connection concerned.

3. Apparatus as claimed in claim 2, wherein said imposed maximum transmission rate is also dependent upon the agreed minimum transmission rates of other such ABR connections.

4. Apparatus as claimed in claim 1, wherein said rate control means are arranged at an ingress node of the network that is linked to other parts of the network by an access link, the imposed maximum transmission rate being dependent upon the available capacity of the access link.

5. Apparatus as claimed in claim 4, wherein said available capacity of the access link is determined by subtracting from the full capacity of the access link the sum of the agreed minimum transmission rates of the ABR connections.

6. Apparatus as claimed in claim 5, wherein the imposed maximum transmission rate $MAXR_{VCj}$ is made equal to:

$$MAXR_{VCj} = SCR_{VCj} + \left[ \frac{SCR_{VCj}}{SCR_{VC1} + SCR_{VC2} + \ldots SCR_{VCn}} \right] AB$$

where:

VC1 to VCn denote the different ABR connections, $VC_j$ being the ABR connection in which congestion has been detected;

$SCR_{VCx}$ is the agreed minimum transmission rate of the ABR connection VCx; and AB is said available bandwidth of the access link.

7. Apparatus as claimed in claim 1, further including bandwidth allocation means operable, when a request is received by the apparatus for establishment of a new ABR connection, to determine the maximum transmission rate for the new connection and to recalculate the respective maximum transmission rates of all the existing ABR connections.

8. Apparatus as claimed in claim 7, wherein:

said rate control means are arranged at an ingress node of the network that is linked to other parts of the network by an access link, the imposed maximum transmission rate being dependent upon the available capacity of the access link, said available capacity of the access link being determined by subtracting from the full capacity of the access link the sum of the agreed minimum transmission rates of the ABR connections; and said bandwidth allocation means are also operable, when the apparatus is in use, to determine an instantaneous available bandwidth of said access link by subtracting from said full capacity of the access link the sum of the actual transmission rates of the ABR connections, and are operable to calculate the maximum transmission rate of each ABR connection based on the determined instantaneous available bandwidth.

9. Apparatus as claimed in claim 8, wherein said maximum transmission rate $MAXR_{VCj}$ is made equal to:

$$MAXR_{VCj} = SCR_{VCj} + \left[ \frac{SCR_{VCj}}{SCR_{VC1} + SCR_{VC2} + \ldots + SCR_{VCn}} \right] IAB$$

where:
- VC1 to VCn denote the different ABR connections, $VC_j$ being the ABR connection in which congestion has been detected;
- $SCR_{VCx}$ is the agreed minimum transmission rate of the ABR connection VCx; and
- IAB is the determined instantaneous available bandwidth.

10. Apparatus as claimed in claim 1, wherein said rate control means send a feedback message to the data source of the congested ABR connection if it is exceeding its said maximum transmission rate when that rate is imposed, which feedback message requests the data source concerned to reduce its transmission rate to the imposed maximum transmission rate.

11. Apparatus as claimed in claim 10, wherein said rate control means impose further restrictions progressively on the transmission rate of the congested ABR connection, if the congestion persists, until the transmission rate is reduced to the agreed minimum transmission rate for the connection concerned.

12. Apparatus as claimed in claim 1, wherein said rate control means detect that congestion is occurring in one of the ABR connections when the determined end-to-end delay for that connection exceeds a predetermined threshold value.

13. Apparatus as claimed in claim 1, wherein the rate control means are operative to impose said maximum transmission rate on the ABR connection concerned immediately when congestion of that connection is detected.

14. Connection control apparatus, for use in an ATM network to control ABR connections provided by the network, each said ABR connection having an agreed minimum transmission rate which it is permitted to exceed when there is spare capacity in the network, which apparatus includes:
- congestion detection means for determining the end-to-end delay experienced by ATM cells of each ABR connection as they pass through the network; and
- rate control means connected to the said congestion detection means for detecting, based on the determined end-to-end delay, when one of the ABR connections is congested, and operative, upon such detection, to impose on the ABR connection concerned a maximum transmission rate that is higher than and dependent upon said agreed minimum transmission rate for the connection concerned;
- said rate control means being operable to detect that congestion is occurring in one of the ABR connections when the determined end-to-end delay for that connection exceeds a predetermined threshold value; and
- said congestion detection means comprising first and second circuits arranged respectively at ingress and egress nodes of the network, one of said first and second circuits being operative to transmit a timing cell to the other of those circuits via the network, and said other circuit being operative to determine the time of receipt of the timing cell concerned;
- the congestion detection means being operative to calculate said end-to-end delay in dependence upon the time taken for said timing cell to travel from said one circuit to said other circuit.

15. Apparatus as claimed in claim 14, wherein said timing cell transmitted from said one circuit to said other circuit carries timing information indicating the time of transmission of the cell concerned by said one circuit, and said other circuit includes relative delay calculation means operative to determine a relative delay value by calculating the difference between said time of transmission of the timing cell and its time of receipt by said other circuit.

16. Apparatus as claimed in claim 15, wherein said other circuit is operative, following receipt of such a timing cell from said one circuit, to transmit a corresponding timing cell back to said one circuit via the network, and said one circuit is operative to determine the time of receipt of said corresponding timing cell;
- said congestion detection means being operative to calculate said end-to-end delay in dependence upon the average of the time taken for the timing cell to travel from said one circuit to said other circuit and the time taken for said corresponding timing cell to travel from said other circuit to said one circuit.

17. Apparatus as claimed in claim 16, wherein said corresponding timing cell transmitted from said other circuit back to said one circuit carries timing information indicating the time of transmission of the cell concerned by said other circuit and also indicating said relative delay value, and said one circuit includes round-trip-delay calculating means operative to determine a round-trip delay value by calculating the difference between said time of transmission of the corresponding timing cell and its time of receipt by said one circuit and subtracting from that difference said relative delay value.

18. A method of controlling ABR connections in an ATM network, each such ABR connection having an agreed minimum transmission rate which it is permitted to exceed when there is spare capacity in the network, which method includes the steps of:
- calculating for each said ABR connection a maximum transmission rate that is hither than and dependent upon said agreed minimum transmission rate for the ABR connection concerned;
- determining the end-to-end delay experienced by ATM cells of each ABR connection as they pass through the network;
- detecting, based on the determined end-to-end delay, when one of the ABR connections is congested; and
- when such congestion is detected, imposing on the ABR connection concerned its said maximum transmission rate and, when no such congestion of the ABR connection concerned is detected, permitting the ABR connection concerned to exceed that maximum transmission rate.

19. Congestion detection apparatus for use in an ATM network, including
- end-to-end delay determining means operable to determine the end-to-end delay experienced by ATM cells of a virtual channel of the network as they pass through the network; and
- congestion detection means connected to the end-to-end delay determining means for detecting congestion in the concerned virtual channel based on the determined end-to-end delay;
- said congestion detection means being operable to detect that congestion is occurring in a virtual channel when the determined end-to-end delay for that channel exceeds a predetermined threshold value; and
- said end-to-end delay determining means comprising first and second circuits arranged respectively at ingress and egress nodes of the network, one of said first and second circuits being operative to transmit a timing cell to the other of those circuits via the network, and said other circuit being operative to determine the time of receipt of the timing cell concerned;

said end-to-end delay determining means being operative to calculate said end-to-end delay in dependence upon the time taken for said timing cell to travel from said one circuit to said other circuit.

20. Apparatus as claimed in claim 19, wherein said timing cell transmitted from said one circuit to said other circuit carries timing information indicating the time of transmission of the cell concerned by said one circuit, and said other circuit includes relative delay calculation means operative to determine a relative delay value by calculating the difference between said time of transmission of the timing cell and its time of receipt by said other circuit.

21. Apparatus as claimed in claim 20, wherein said other circuit is operative, following receipt of such a timing cell from said one circuit, to transmit a corresponding timing cell back to said one circuit via the network, and said one circuit is operative to determine the time of receipt of said corresponding said end-to-end delay determining means being operative to calculate said end-to-end delay in dependence upon the average of the time taken for the timing cell to travel from said one circuit to said other circuit and the time taken for said corresponding timing cell to travel from said other circuit to said one circuit.

22. Apparatus as claimed in claim 21, wherein said corresponding timing cell transmitted from said other circuit back to said one circuit carries timing information indicating the time of transmission of the cell concerned by said other circuit and also indicating said relative delay value, and said one circuit includes round-trip-delay calculating means operative to determine a round-trip delay value by calculating the difference between said time of transmission of the corresponding timing cell and its time of receipt by said one circuit and subtracting from that difference said relative delay value.

23. A method of detecting congestion in an ATM network, including the steps of:

determining the end-to-end delay experienced by ATM cells of a virtual channel of the network as they pass through the network by:

employing one of first and second circuits, arranged respectively at ingress and egress nodes of the network, to transmit a timing cell to the other of those circuits via the network;

employing the other of said first and second circuits to determine the time of receipt of the timing cell concerned; and calculating said end-to-end delay in dependence upon the time taken for said timing cell to travel from said one circuit to said other circuit; and detecting that congestion is occurring in the virtual channel concerned when the determined end-to-end delay for that channel exceeds a predetermined threshold value.

24. Connection control apparatus, for use in an ATM network to control ABR connections provided by the network, each said ABR connection having an agreed minimum transmission rate which it is permitted to exceed when there is spare capacity in the network, which apparatus includes:

maximum transmission rate calculation means for calculating for each said ABR connection a maximum transmission rate that is higher than and dependent upon said agreed minimum transmission rate for the connection concerned;

congestion detection means for determining the end-to-end delay experienced by ATM cells of each ABR connection as they pass through the network; and rate control means connected to the said congestion detection means for detecting, based on the determined end-to-end delay, when one of the ABR connections is congested, and operative, upon such detection, to impose on the ABR connection concerned its said maximum transmission rate, and, when no such congestion of the ABR connection concerned is detected, to permit the ABR connection concerned to exceed that maximum transmission rate;

said rate control means being operable to send a feedback message to the data source of the congested ABR connection if it is exceeding its said maximum transmission rate when that rate is imposed, which feedback message requests the data source concerned to reduce its transmission rate to the imposed maximum transmission rate, and also being operable to impose further restrictions progressively on the transmission rate of the congested ABR connection, if the congestion persists, until the transmission rate is reduced to the agreed minimum transmission rate for the connection concerned.

25. Apparatus as claimed in claim 24, wherein the imposed maximum transmission rate is increased when said agreed minimum transmission rate increases for the connection concerned.

26. Apparatus as claimed in claim 25, wherein said imposed maximum transmission rate is also dependent upon the agreed minimum transmission rates of other such ABR connections.

27. Apparatus as claimed in claim 24, wherein said rate control means are arranged at an ingress node of the network that is linked to other parts of the network by an access link, the imposed maximum transmission rate being dependent upon the available capacity of the access link.

28. Apparatus as claimed in claim 27, wherein said available capacity of the access link is determined by subtracting from the full capacity of the access link the sum of the agreed minimum transmission rates of the ABR connections.

29. Apparatus as claimed in claim 28, wherein the imposed maximum transmission rate $MAXR_{VCj}$ is made equal to:

$$MAXR_{VCj} = SCR_{VCj} + \left[\frac{SCR_{VCj}}{SCR_{VC1} + SCR_{VC2} + \ldots SCR_{VCn}}\right] AB$$

where:

VC1 to VCn denote the different ABR connections, $VC_j$ being the ABR connection in which congestion has been detected;

$SCR_{VCx}$ is the agreed minimum transmission rate of the ABR connection VCx; and AB is said available bandwidth of the access link.

30. Apparatus as claimed in claim 24, further including bandwidth allocation means operable, when a request is received by the apparatus for establishment of a new ABR connection, to determine the maximum transmission rate for the new connection and to recalculate the respective maximum transmission rates of all the existing ABR connections.

31. Apparatus as claimed in claim 30, wherein:

said rate control means are arranged at an ingress node of the network that is linked to other parts of the network by an access link, the imposed maximum transmission rate being dependent upon the available capacity of the access link, said available capacity of the access link being determined by subtracting from the full capacity of the access link the sum of the agreed minimum transmission rates of the ABR connections; and said bandwidth allocation means are also operable, when the apparatus is in use, to determine an instantaneous available bandwidth of said access link by subtracting from said full capacity of the access link the sum of the actual transmission rates of the ABR connections, and are operable to calculate the maximum transmission rate of each ABR connection based on the determined instantaneous available bandwidth.

32. Apparatus as claimed in claim 31, wherein said maximum transmission rate $MAXR_{VCj}$ is made equal to:

$$MAXR_{VCj} = SCR_{VCj} + \left[ \frac{SCR_{VCj}}{SCR_{VC1} + SCR_{VC2} + \ldots + SCR_{VCn}} \right] IAB$$

where:

VC1 to VCn denote the different ABR connections, $VC_j$ being the ABR connection in which congestion has been detected;

$SCR_{VCx}$ is the agreed minimum transmission rate of the ABR connection VCx; and IAB is the determined instantaneous available bandwidth.

33. Apparatus as claimed in claim 24, wherein said rate control means detect that congestion is occurring in one of the ABR connections when the determined end-to-end delay for that connection exceeds a predetermined threshold value.

34. A method of controlling ABR connections in an ATM network, each such ABR connection having an agreed minimum transmission rate which it is permitted to exceed when there is spare capacity in the network, which method includes the steps of:

calculating for each said ABR connection a maximum transmission rate that is higher than and dependent upon said agreed minimum transmission rate for the ABR connection concerned;

determining the end-to-end delay experienced by ATM cells of each ABR connection as they pass through the network;

detecting, based on the determined end-to-end delay, when one of the ABR connections is congested and when such congestion is detected, imposing on the ABR connection concerned its said maximum transmission rate and, when no such congestion of the ABR connection concerned is detected, permitting the ABR connection concerned to exceed that maximum transmission rate;

sending a feedback message to the data source of the congested ABR connection if it is exceeding its said maximum transmission rate when that rate is imposed, which feedback message requests the data source concerned to reduce its transmission rate to the imposed maximum transmission rate; and imposing further restrictions progressively on the transmission rate of the congested ABR connection, if the congestion persists, until the transmission rate is reduced to the agreed minimum transmission rate for the connection concerned.

\* \* \* \* \*